(12) United States Patent
Kanemoto et al.

(10) Patent No.: US 10,836,138 B2
(45) Date of Patent: Nov. 17, 2020

(54) LAMINATED BODY HAVING CORROSION-RESISTANT COATING, AND METHOD FOR MANUFACTURING SAME

(71) Applicant: HITACHI, LTD., Tokyo (JP)

(72) Inventors: Hiroshi Kanemoto, Tokyo (JP);
Katsumi Mabuchi, Tokyo (JP);
Hiroshi Nakano, Tokyo (JP)

(73) Assignee: HITACHI, LTD., Tokyo (JP)

(*) Notice: Subject to any disclaimer, the term of this patent is extended or adjusted under 35 U.S.C. 154(b) by 234 days.

(21) Appl. No.: 15/571,208

(22) PCT Filed: Apr. 22, 2016

(86) PCT No.: PCT/JP2016/062693
§ 371 (c)(1),
(2) Date: Nov. 1, 2017

(87) PCT Pub. No.: WO2016/178372
PCT Pub. Date: Nov. 10, 2016

(65) Prior Publication Data
US 2018/0264782 A1    Sep. 20, 2018

(30) Foreign Application Priority Data

May 7, 2015 (JP) .................... 2015-094568

(51) Int. Cl.
*B32B 15/01* (2006.01)
*C25D 5/14* (2006.01)
(Continued)

(52) U.S. Cl.
CPC .............. *B32B 15/01* (2013.01); *C23C 28/00* (2013.01); *C23C 28/023* (2013.01); *C23C 28/34* (2013.01);
(Continued)

(58) Field of Classification Search
None
See application file for complete search history.

(56) References Cited

U.S. PATENT DOCUMENTS

| 2,993,264 | A |   | 7/1961 | Grenoble |
| 3,009,236 | A | * | 11/1961 | Knapp ................ C25D 5/14 |
|   |   |   |   | 428/652 |

(Continued)

FOREIGN PATENT DOCUMENTS

| CN | 101487134 A | 7/2009 |
| FR | 1283812 A | 2/1962 |

(Continued)

OTHER PUBLICATIONS

Noro et al., "Intermetallic Phase Formation in Nanometric Ni/Al Multilayer Thin Films," Intermetallics (2008), vol. 16, pp. 1061-1065. (Year: 2008).*

(Continued)

*Primary Examiner* — Daniel J. Schleis
(74) *Attorney, Agent, or Firm* — Volpe Koenig

(57) ABSTRACT

An object of the present invention is to provide a product excellent in corrosion resistance and abrasion resistance. In order to achieve the above object, a laminated body according to the invention includes a substrate and a coating formed on the surface of the substrate, in which the coating includes repeated unit structures each composed of a first layer whose main component is Ni and a second layer whose main component is a metal whose electrode potential is baser than that of Ni.

8 Claims, 7 Drawing Sheets

(51) Int. Cl.
  *C23C 28/02* (2006.01)
  *C23C 28/00* (2006.01)
  *C25D 3/56* (2006.01)
  *C25D 21/12* (2006.01)
  *C25D 3/22* (2006.01)
  *C25D 3/12* (2006.01)
  *C25D 5/34* (2006.01)

(52) U.S. Cl.
  CPC ........ *C23C 28/345* (2013.01); *C23C 28/3455* (2013.01); *C23C 28/42* (2013.01); *C25D 3/562* (2013.01); *C25D 5/14* (2013.01); *C25D 21/12* (2013.01); *B32B 2250/42* (2013.01); *B32B 2255/06* (2013.01); *B32B 2307/584* (2013.01); *B32B 2307/714* (2013.01); *B32B 2311/20* (2013.01); *B32B 2311/22* (2013.01); *C25D 3/12* (2013.01); *C25D 3/22* (2013.01); *C25D 5/34* (2013.01)

(56) References Cited

U.S. PATENT DOCUMENTS

| | | |
|---|---|---|
| 6,465,114 B1 | 10/2002 | Honda et al. |
| 2001/0038029 A1 | 11/2001 | Weihs et al. |
| 2003/0048582 A1 | 3/2003 | Kanada et al. |
| 2009/0274927 A1 | 11/2009 | Narita |
| 2013/0122322 A1 | 5/2013 | Nakajima et al. |
| 2014/0016233 A1 | 1/2014 | Kato et al. |

FOREIGN PATENT DOCUMENTS

| | | | |
|---|---|---|---|
| JP | 59-200788 A | | 11/1984 |
| JP | 61-119679 A | | 6/1986 |
| JP | 62-033795 A | | 2/1987 |
| JP | 63-105990 A | | 5/1988 |
| JP | 02-240280 A | | 9/1990 |
| JP | 03-257193 A | | 11/1991 |
| JP | 04-246190 A | | 9/1992 |
| JP | 07-014738 A | | 1/1995 |
| JP | 07-109596 A | | 4/1995 |
| JP | 07-238386 A | | 9/1995 |
| JP | 07-252672 A | | 10/1995 |
| JP | 2000-325871 A | | 11/2000 |
| JP | H0714738 A | * | 12/2000 |
| JP | 203-077723 A | | 3/2003 |
| JP | 2006-052130 A | | 2/2006 |
| JP | 2008-050668 A | | 3/2008 |
| JP | 2009-185346 A | | 8/2009 |
| JP | 2010-285653 A | | 12/2010 |
| JP | 2014-022718 A | | 2/2014 |
| JP | 2015-172159 A | | 10/2015 |
| WO | 2008/059971 A1 | | 5/2008 |

OTHER PUBLICATIONS

Japanese Office Action dated Apr. 16, 2019 for the Japanese Patent Application No. 2017-516585.
Chinese Office Action dated Aug. 14, 2019 for the Chinese Patent Application No. 201680026186.5.
Extended European Search Report dated Nov. 12, 2018 for the European Patent Application No. 16789508.5.
International Search Report, PCT/JP2016/062693, dated Jul. 12, 2016, 2 pgs.
Rao, V.R., et al, "Nanofabricated Multilayer Coatings of Zn—Ni Alloy for Better Corrosion Protection," Protection of Metals and Physical Chemistry of Surfaces, 2013, vol. 49, No. 6, pp. 693-698.
M. Fukunishi, et al., "The Wear Resistance Property of Cu/Ni Multilayer Films Prepared by Electrodeposition in Single and Dual Baths," Surface Technology, 2011, vol. 62, No. 12, pp. 681-685.

* cited by examiner

LAMINATED BODY HAVING CORROSION-RESISTANT COATING, AND METHOD FOR MANUFACTURING SAME

TECHNICAL FIELD

The present invention relates to a laminated body having a corrosion-resistant coating, and a method for manufacturing the same.

BACKGROUND ART

In recent years, there has been an increasing tendency that various kinds of equipment are used under environments harsher than before. The examples thereof include, for example: plumbing and pumps used in offshore wind power generation facilities and for seawater desalination; automobiles and construction equipment in areas where snow melting agents, etc., are scattered in so large amounts that salt damages are significant; and the like. In the metal parts used in such products, deterioration of the metal surfaces due to complex factors, such as corrosion and abrasion, progresses, which may lead to an increase in maintenance frequency and shortening of the lives of the equipment. Currently, surface treatments by hexavalent chromium plating excellent in corrosion resistance and abrasion resistance have mainly been adopted for a long time for parts that are deteriorated due to the above-mentioned complex factors. However, hexavalent chromium is designated as a substance of high concern in both environmental regulations, such as REACH regulation, and wastewater regulations, and a reduction in its use is desired globally. In view of such background, various surface treatment techniques have been proposed as a plating technique to replace hexavalent chromium plating.

Patent Literature 1 discloses a multilayer Ni alloy plating film in which: in the multilayer Ni alloy plating in which a plurality of Ni alloy plating layers are provided in order to improve corrosion resistance, each Ni alloy plating layer contains an element selected from P, B, and S at a different concentration; and the potential relationship between adjacent Ni alloy plating layers is such that the outside Ni alloy plating layer is baser than the inside Ni plating layer by 30 mV or more.

Non-Patent Literature 1 discloses an alternately laminated film of Ni and Zn in which the content ratio of Ni in the entire coating is 2 to 9 wt % in order to improve corrosion resistance.

Patent Literature 2 discloses: a method for forming a plating multilayer film, including both a step of continuously forming a large number of grooves each having a substantially triangular sectional shape in the surface of a metal substrate by grinding or cutting and a step of alternately laminating two or more types of metal films, each having a uniform thickness and made of a material different from the others, on the groove and along the sectional shape of the groove by plating, the method being aimed at improving abrasion resistance; and a structural member formed by the above method.

Non-Patent Literature 2 discloses a plating film in which Ni and Cu are alternately laminated for improving abrasion resistance.

CITATION LIST

Patent Literature

Patent Literature 1: Japanese Patent Application Laid-Open No. S63 (1988)-105990

Patent Literature 2: Japanese Patent Application Laid-Open No. 2010-285653

Non-Patent Literature

Non-Patent Literature 1: Protection of Metals and Physical Chemistry of Surfaces, 2013, 49, 6, 693
Non-Patent Literature 2: Surface Technology, 2011, 62, 12, 681

SUMMARY OF INVENTION

Technical Problem

The corrosion-resistant coating disclosed in Patent Literature 1 is a corrosion-resistant coating containing Ni as a main component and metalloid elements such as P. In this coating, the mutual potential between adjacent plating layers is as small as 30 mV, and a sacrificial anticorrosion effect by the layer with a lower potential is not large. Therefore, a further improvement in corrosion resistance is required under a severe corrosive environment.

The corrosion-resistant coating disclosed in Non-Patent Literature 1 is composed of a layer having a high content ratio of Ni and a layer having a low content ratio of Ni. In this coating, however, the content ratio of Ni is approximately 10% even in the layer having a high content ratio of Ni and the main component is Zn. Therefore, the corrosion resistance is lower than a plating film of Ni alone, and hence a further improvement is required for use under a severe corrosive environment.

The coatings disclosed in Patent Literature 2 are a multilayer plating film of a Pd or Ru layer and a Ni layer, and a multilayer plating film of a Ni layer and a Sn layer. Although these coatings are considered to be effective for improving abrasion resistance, they are not intended to improve corrosion resistance due to the expression of a sacrificial anticorrosion effect. Pd, Ru, and the like are metals with a noble standard electrode potential and are excellent in corrosion resistance, but they are expensive metals and have problems in economy and resources. With respect to the multilayer plating film of a Ni layer and a Sn layer, Ni functions as a sacrificial anticorrosion metal from the electrochemical relationship. Therefore, a further improvement is required for improving corrosion resistance. Further, Patent Literature 2 discloses examples of various metal film materials, but when a laminated coating is formed by wet plating, there is a process problem, depending on the combination of metal types. That is, unless plating conditions are properly selected when an electrochemically noble metal is plated on the surface of a plating film of a base metal that is different from the noble metal, the base metal is dissolved when immersed in a plating solution, so that a desired laminated film cannot be obtained.

The coating disclosed in Non-Patent Literature 2 is a plating film in which Ni and Cu are alternately laminated, which is aimed at improving abrasion resistance. Cu is an electrochemically base metal as compared to Ni, and there is a problem in corrosion resistance.

Therefore, an object of the present invention is to provide a product excellent in corrosion resistance and abrasion resistance without containing a substance of high concern to environment.

Solution to Problem

In order to solve the above-mentioned problems, a laminated body according to the present invention includes a substrate and a coating formed on the surface of the substrate, in which the coating includes repeated unit structures each composed of a first layer whose main component is Ni and a second layer whose main component is a metal whose electrode potential is baser than that of Ni.

Advantageous Effects of Invention

According to the present invention, a product excellent in corrosion resistance and abrasion resistance can be provided.

DESCRIPTION OF EMBODIMENTS

Hereinafter, a coating according to one embodiment of the present invention and a product using the coating will be described. It should be noted that the present invention is not to be construed as being limited thereto but can be modified based on knowledge and perception of a person skilled in the art as long as the invention does not depart from the scope of the present invention.

Figure 1:
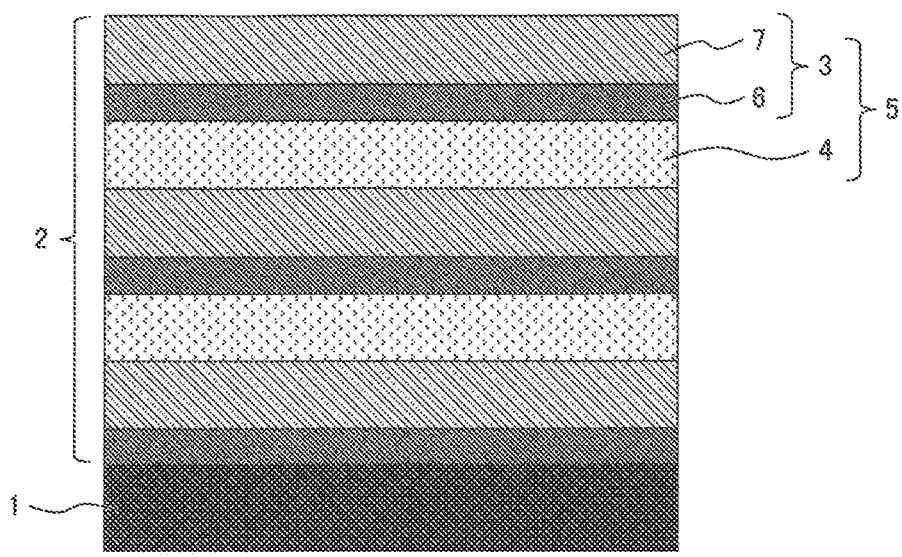
FIG. 1 is a schematic structural view illustrating a coating according to one embodiment of the present invention.

FIG. 1 is a sectional view illustrating one embodiment of a structural member of the present invention. A laminated body according to the present invention includes a substrate 1 and a coating 2 formed on the surface of the substrate 1. The coating 2 includes repeated unit structures 5, each of which has a laminated structure in which at least two types of metal layers, that is, a first layer 3 and a second layer 4, are laminated. FIG. 1 illustrates a coating obtained by laminating 2.5 units of the unit structures. The main component of the first layer is Ni, and that of the second layer is a metal whose electrode potential is baser than that of Ni. The metals that form the first and second metal layers may be alloys. Herein, the main component means a component whose content ratio is 50 wt % or more in a layer. In addition, the first layer may be composed of a plurality of layers (lower layer 6, upper layer 7) having different content ratios of Ni.

In the laminated body having the coating according to the present invention, the first layer acts as a highly corrosion-resistant layer and the second layer as a sacrificial anticorrosion structure. Even if a defect occurs in the first layer as a highly corrosion-resistant layer, due to the development of corrosion, the second layer that is a lower layer is exposed, and hence the metal whose electrode potential is baser than that of Ni is preferentially dissolved, whereby the dissolution of the Ni layer, the first layer, can be suppressed. As a result, fatal local corrosion, such as pitting corrosion, can be suppressed and the exposure of the substrate can be suppressed.

The first and second layers can be formed by a wet process such as electroplating or electroless plating, or a dry process such as sputtering. For the formation method, electroplating or electroless plating is preferable because facilities and processes are simple.

For the first layer, for example, Ni formed by electroplating, or NiP, NiB, or the like formed by electroplating to which P or B is added as an additive, can be selected. It is also possible to select NiP, NiB, or the like formed by electroless plating.

The content ratio of Ni in the first layer is preferably 80 wt % or more. When the content ratio is 80 wt % or less, the property of corrosion resistance originally possessed by Ni is deteriorated. For other components, metals electrochemically nobler than Ni can be selected. However, most of those metals are expensive, and from the practical point of view, it is preferable to select Sn, Cu, or the like.

For the purpose of adjusting coating hardness, the first layer may contain an oxide, a carbide, a nitride, or an organic polymer in addition to the main component. For example, WO, $TiO_2$, $SiO_2$, or $Al_2O_3$ can be used as the oxide, and SiC as the carbide, and BN as the nitride. The hardness of the coating can be increased by containing these components therein. The above-mentioned components can be incorporated into the film together with the deposition of Ni metal by performing plating under a condition in which these components are added or dispersed in an electroplating solution or an electroless plating solution. Similarly, it is possible to incorporate an organic polymer, such as a fluorine-based resin, into the film.

It is preferable that the first layer is composed of a plurality of layers having different physical properties. For example, the first layer is composed of layers having different Ni content ratios or crystal grain sizes. With such a structure, it is possible to properly form the first layer on the second layer. Since the second layer contains an electrochemically baser metal as compared to the first layer, when immersed in a plating solution for forming the first layer after the second layer is formed, an electrochemical substitution plating reaction proceeds between the metal contained in the second layer and the Ni ions in the plating solution. As a result, the metal contained in the second layer is dissolved in the plating solution, so that the second layer may disappear. Also, the metal contained in the second layer may be dissolved by a reaction with the hydrogen ions in the plating solution. Therefore, when the first layer is formed on the second layer, plating is performed promptly at a high current density after immersing in the Ni plating solution. Thereafter, plating is performed at a lowered current density, whereby a coating excellent in smoothness can be obtained. Depending on the type of the plating solution used for forming the first layer, a layer having a different Ni content ratio or a different crystal grain size can be obtained depending on the magnitude of the current density.

The main component of the second layer is a metal whose electrode potential is baser than that of Ni. Zn, Fe, Al, or the like can be selected as the metal whose electrode potential is baser than that of Ni. As an alloy thereof, NiZn, NiFe, NiAl, ZnFe, ZnAl, FeAl, or the like can be selected. Among them, a metal, the electrode potential of which is baser than that of Ni by 200 mV or more, is preferable. With respect to the alloy, the metal ratio in the alloy and the like are not particularly limited, as long as the electrode potential of the metal is baser than that of Ni. When the electrode potential of the alloy is not known, it is possible to determine the alloy components by measuring an immersion potential in a 5% sodium chloride aqueous solution and comparing it with the electrode potential of Ni. With respect to Zn, Fe and alloys thereof, it is possible to form a film by using a known aqueous solution type plating solution. With respect to Al, it is possible to form a film by using a plating solution in which an ionic liquid or a non-aqueous solvent is used as a solvent. It is also possible to form a film by hot-dip plating. Similarly to the first layer, an oxide, a carbide, a nitride, or an organic polymer can be incorporated into the film, if necessary.

In order to improve corrosion resistance and abrasion resistance, the thickness of each layer is preferably 1 μm or less, and more preferably 0.1 μm or less. By adjusting the thickness of each layer as described above, it is possible to miniaturize metal crystals in the film thickness direction and to increase the hardness of the coating. Especially, the effect becomes remarkable at 0.1 μm or less. It is not necessary that the first and second layers have the same film thickness. The film thickness of the entire coating can be appropriately set in accordance with specifications, such as corrosion resistance, abrasion resistance, or durability, required of a part or product to which the coating is applied.

As a more preferred embodiment, after the first and second layers are formed into a laminated body by plating, an alloy layer of the respective metal layers (an alloy layer of Ni and a metal whose electrode potential is baser than that of Ni) may be formed between the respective metal layers. The adhesion between the layers is thereby improved, and the hardness of the coating is increased due to the presence of the alloy layer, whereby abrasion resistance can be improved. A heat treatment or the like can be adopted for forming the above alloy layer. However, depending on the types of the metals selected for the respective layers, a metal that is dissolved in each other is formed, so it is necessary to select an appropriate temperature and time under which the metal is not dissolved.

The outermost layer (outermost surface layer) of the coating is preferably the first layer. This is intended to express the function of the first layer originally excellent in corrosion resistance. When the sacrificial anticorrosion layer is present in the outermost layer, corrosion proceeds in the outermost layer at the beginning of use, which is not preferable.

Figure 4:
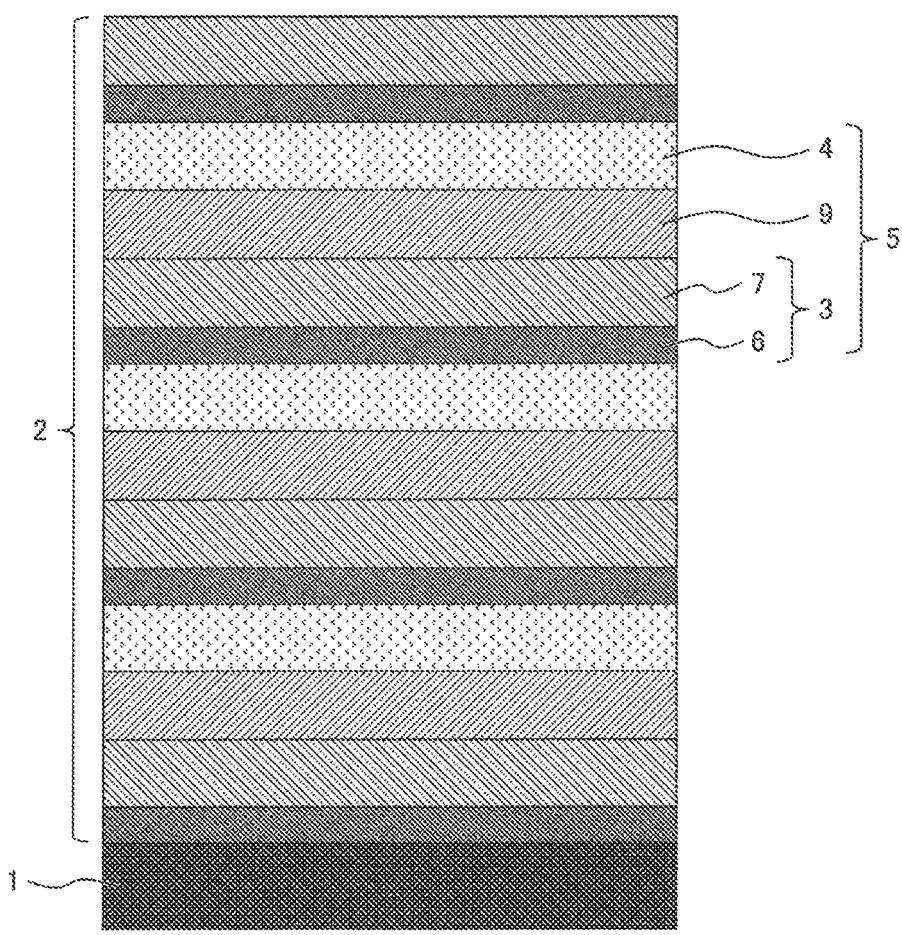
FIG. 4 is a schematic structural view illustrating a coating according to one embodiment of the present invention.

In the above one embodiment, a coating, in which the unit structures each composed of the first layer and the second layer are repeatedly laminated, has been described, but a third layer 9 may be provided between the first layer and the second layer. For example, the unit structure may be formed as illustrated in FIG. 4, in which the first layer is made of Ni metal, the second layer of Zn metal that is a baser metal than Ni, and the third layer of Ni metal containing SiC in the film.

Figure 2:
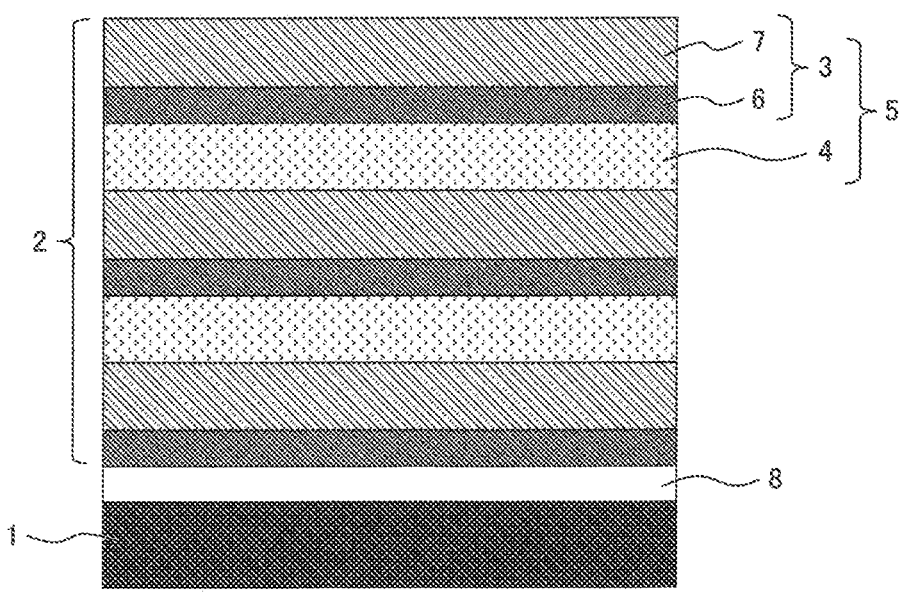
FIG. 2 is a schematic structural view illustrating a coating according to one embodiment of the present invention.
Figure 3:
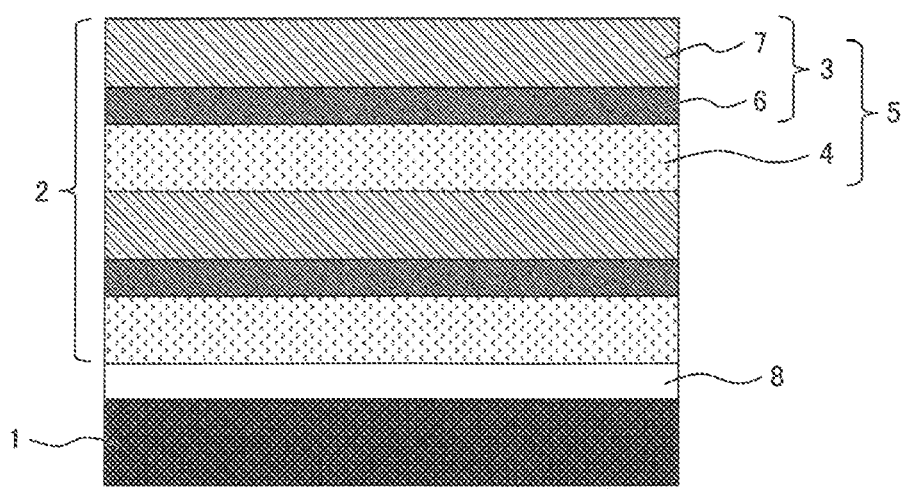
FIG. 3 is a schematic structural view illustrating a coating according to one embodiment of the present invention.

A substrate, on which the above-mentioned coating is formed, is not particularly limited, but it can be appropriately selected depending on the purpose from the group consisting of steel, carbon steel, stainless steel, Cu, Al, alloys thereof, and the like. Regardless of which substrate is used, impurity removal, such as degreasing and pickling, is performed as a pretreatment for plating. With respect to a substrate whose surface is susceptible to passivation, such as stainless steel, it is preferable for the purpose of improving the adhesion between the substrate and the plating film to form an adhesion layer 8 as the closest layer to the substrate as illustrated in FIG. 2 by using a nickel chloride-based Ni plating solution called Wood's bath. When Al or an Al alloy is used for the substrate, it is preferable to form the coating after the adhesion layer 8 containing Ni as a main component is formed by a known zincate treatment and electroless Ni plating. In this case, after the adhesion layer 8 is formed, the first layer may be formed in the following process, or the second layer may be formed as illustrated in FIG. 3.

The above-mentioned coating can be applied to parts and products that are required to have corrosion resistance and abrasion resistance. The shape of the substrate is not particularly limited, but the coating can be applied to parts that are lump-shaped, flat plate-shaped, bent plate-shaped, and cylinder-shaped. When the coating is formed by electroplating, the film thickness may vary according to location depending on the shape of a part and due to the influence of current distribution, and hence it is preferable to perform the electroplating under the conditions in which a film thickness variation according to location is reduced: by measuring in advance the influence of current distribution with analysis and actual measurement; if necessary, by installing a shielding plate or the like between an object to be plated and a counter electrode; and the like.

Hereinafter, a method for forming the coating will be described. When the first layer is formed on the surface of the second layer containing as the main component a metal whose deposition potential is baser than that of Ni, by immersing the second layer in a Ni plating solution, there is a fear that the metal whose deposition potential is baser than that of Ni may be dissolved due to a reaction between the metal and the hydrogen ions in the plating solution, or that the metal whose deposition potential is baser than that of Ni may be dissolved due to a substitution reaction with Ni ions. Therefore, some ingenuity is required in order to form Ni plating on the surface of the second layer containing a metal whose deposition potential is baser than that of Ni.

As a result of our intensive study, it is preferable to form the first layer by at least two layers having different physical properties, in order to properly form the first layer on the surface of the second layer while the dissolution of the second layer is being suppressed. The layers having different physical properties mean, for example, layers having different crystal grain sizes of Ni or layers having different Ni content ratios.

A method for manufacturing a laminated body according to the present invention includes: a first plating step of forming the first layer on the substrate or the second layer; and a second plating step of forming the second layer on the first layer, in which in the first plating step, plating is performed by using a plating solution at 25° C. or lower and at a current density higher than that in the second plating step. That is, preferable conditions of the plating process are: to set the temperature of a plating solution for forming the first layer to be as low as 25° C. or lower; and in the case of constant current electrolysis, different currents are applied in a stepwise manner and the initial current is set to be high. In the case of constant potential electrolysis, it is preferable to apply a potential in a stepwise manner and set the initial potential to be low. The phenomenon occurring here will be described, taking the case of constant current electrolysis. By setting the temperature of the plating solution to be low, the reaction activity between the second layer and the hydrogen ions or Ni ions in the plating solution can be lowered, and accordingly the dissolution of the metal contained in the second layer can be suppressed. Further, by applying a high current quickly after the substrate on which the second layer is formed is immersed in the plating solution, deposition of Ni on the surface of the second layer preferentially proceeds. As a result, the dissolution of the metal contained in the second layer can be suppressed. After the surface of the second layer can be almost entirely covered under a high current condition, the condition is changed to a low current condition and subsequently the first layer is formed, whereby the first layer can be smoothed. By adopting the above-mentioned plating conditions, it is possible to obtain a laminated coating in which Ni and a metal baser than Ni are combined.

Hereinafter, examples in which the above coating is formed on a substrate will be described. However, the present invention is not limited to these examples.

Example 1

<Formation of Coating>

A steel SS400 plate (SS400 is a type of rolled steel for general structure specified in JIS Standard) having a size of 50×70 mm and a thickness of 3 mm, which is finished to a surface roughness Ra of 0.05 μm by mechanical polishing, was used as a substrate. As the Ni electroplating solution to be used for forming the first layer, a Watts bath shown in Table 1 containing an additive was used. As the Zn electroplating solution to be used for forming the second layer, a zincate bath shown in Table 2 was used. The target plating film thickness of each layer in the first and second layers was set to 0.9 μm.

First, degreasing and pickling were performed as a plating pretreatment in order to remove the oil and oxide film on the surface of SS400. After the SS400 was washed with water, Ni plating was performed, as the first layer, by using the plating solution shown in Table 1, under a condition in which the temperature of the plating solution was 20° C., and for a predetermined period of time. The current density condition was initially set to 11 A/dm$^2$ and then switched in a stepwise manner to 3 A/dm$^2$. Following water washing after the Ni plating, Zn plating was performed by using the plating solution shown in Table 2, under a condition in which the temperature of the plating solution was 20° C., at a current density of 1 A/dm$^2$, and for a predetermined period of time. Thereafter, the Ni plating and the Zn plating were repeated a predetermined number of times such that the outermost layer contained Ni, and finally washing with water and drying were performed, whereby a coating, including 11 layers composed of 6 Ni layers and 5 Zn layers, was formed.

In the Ni and Zn plating, a constant current power supply capable of program control of a current value was used. In the case of the Ni plating, an SS400 substrate to be plated was used as the working electrode and a Ni plate was used as the counter electrode. In the case of the Zn plating, a carbon plate was used as the counter electrode.

TABLE 1

| Component | Concentration |
|---|---|
| NiSO$_4$ | 280 g/L |
| NiCl$_2$ | 45 g/L |
| H$_3$BO$_3$ | 40 g/L |
| Additive | Proper quantity |
| pH | 4.5 |

TABLE 2

| Component | Concentration |
|---|---|
| ZnO | 10 g/L |
| NaOH | 100 g/L |
| Additive | Proper quantity |
| pH | 14 |

<SEM Observation>

Figure 5:
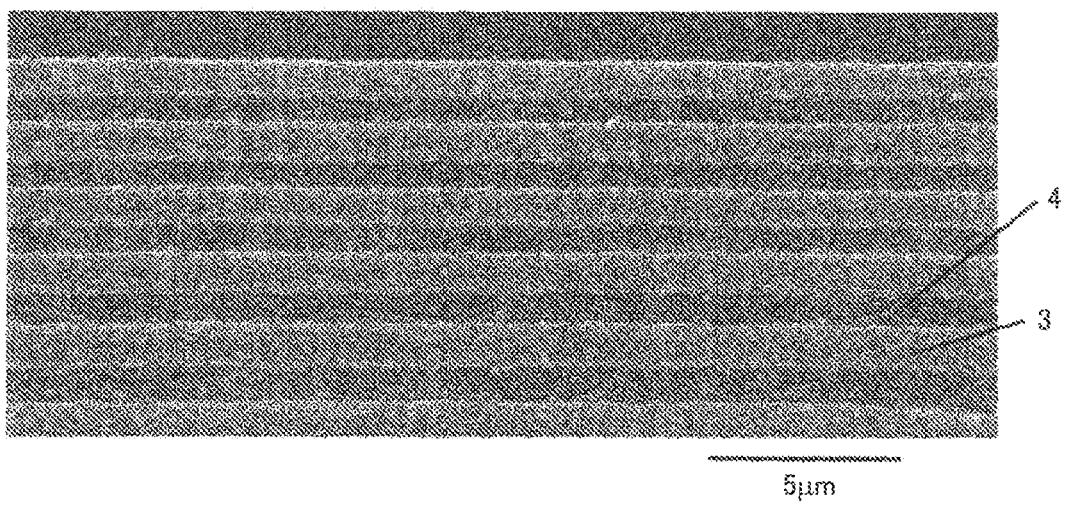
FIG. 5 is a structural observation image of the section of a coating of Example 1.

FIG. 5 illustrates the sectional structure of the obtained coating. It was confirmed that an alternately laminated film composed of the first layer 3 and the second layer 4 was formed on the surface of the substrate (not illustrated), as illustrated in FIG. 5. In order to observe the structure of the Ni layer (first layer) in more detail, the structure was exposed by etching and SEM observation was performed at high magnification. As a result, it was confirmed that the Ni layer was formed of two layers in the layer, that is, a lower layer and an upper layer. The film thicknesses of the lower layer and the upper layer were approximately 0.7 μm and 0.2 μm, respectively. The grain size in the lower layer was 0.1 μm on average and that in the upper layer was 0.2 μm on average. Further, it was confirmed from the analysis of the content ratio of Ni in the Ni layer by Auger spectroscopy analysis that the Ni content ratio was higher in the lower layer than in the upper layer.

Example 2

In a laminated body according to Example 2, a coating, including 19 layers composed of 10 Ni layers and 9 Zn layers, was formed in which the plating film thickness of each of the first and second layers was set to 0.5 μm. With respect to plating conditions, plating was performed in the same procedure as in Example 1, except that the plating time was changed.

Figure 9:
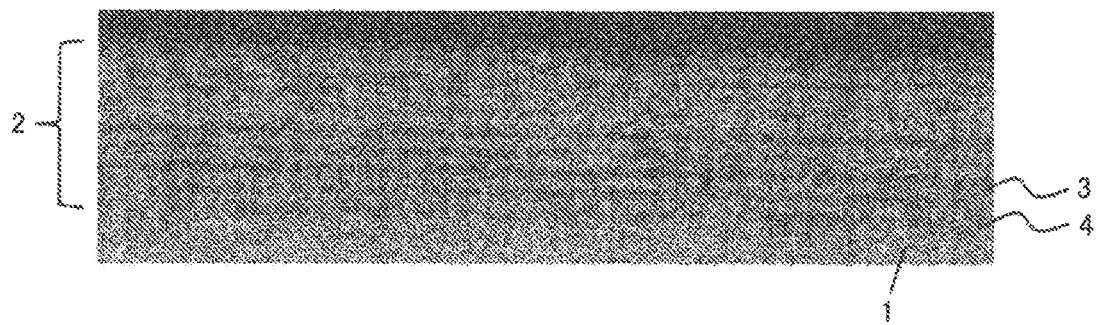
FIG. 9 is a structural observation image of the section of a coating of Example 2.

FIG. 9 illustrates an observation image of the sectional structure of the obtained coating. A coating structure, in which the respective layers were repeatedly laminated as illustrated in FIG. 9, was confirmed. As a result of evaluating corrosion resistance and abrasion resistance in the same way as in Example 1, the pitting potential was −289 mV and the abrasion resistance was 0.012 m/μg. It was found that the corrosion resistance performance was lower than that of the coating of Example 1 but was more excellent than those of SS400 that formed the substrate, Al, electroplated Zn, and electroplated NiZn alloy. It was found that the abrasion resistance performance was better than that in Example 1. It is considered that the crystal grain size in the plating film of each layer is restricted in the film thickness direction and accordingly becomes fine by reducing the layer thickness of each layer in the coating, whereby the coating becomes hard and abrasion resistance is improved.

As described above, the effect of improving abrasion resistance, while maintaining corrosion resistance to some extent, was able to be obtained by reducing the layer thickness of each layer in the coating.

Example 3

In Example 3, a coating was formed in the same way as in Example 1, except that the second layer was made of Al. The Al coating was formed by sputtering.

Example 4

In Example 4, a coating was formed in the same way as in Example 1, except that the case where the second layer was made of a NiZn alloy. With respect to NiZn plating conditions, plating was performed by using the plating solution shown in Table 3, under conditions in which the temperature of the plating solution was 25° C. and a current density was 3 A/dm$^2$, and for a predetermined period of time.

TABLE 3

| Component | Concentration |
| --- | --- |
| NiCl$_2$·6H$_2$O | 95 g/L |
| ZnCl$_2$ | 20 g/L |
| H$_2$BO$_3$ | 28 g/L |
| NH$_4$Cl | 100 g/L |
| Additive | Proper quantity |
| pH | 4 |

Example 5

In Example 5, a coating was formed in which the first and second layers were made of NiP and Zn, respectively. The target plating film thickness of each layer in the first and second layers was set to 0.8 µm, and a coating, including 5 layers composed of 3 Ni layers and 2 Zn layers, was formed. With respect to Zn plating conditions, plating was performed in the same procedure as in Example. With respect to NiP plating conditions, constant current electrolysis was performed by using the Ni plating solution containing phosphorous acid shown in Table 4 and under the conditions in which the temperature of the plating solution was 25° C. and a current density was initially set to 15 A/dm$^2$ and then switched in a stepwise manner to 5 A/dm$^2$.

TABLE 4

| Component | Concentration |
| --- | --- |
| NiSO$_4$ | 74 g/L |
| NiCl$_2$ | 30 g/L |
| H$_2$BO$_3$ | 20 g/L |
| H$_3$PO$_3$ | 2 g/L |
| Additive | Proper quantity |
| pH | 3 |

Example 6

In Example 6, a coating was formed by using the coating made in Example 5 and by performing plating followed by a heat treatment. The heat treatment was performed under a nitrogen environment, at 250° C., and for 30 minutes.

Comparative Example 1

In Comparative Example 1, SS 400 used for the substrate of Example 1 was used.

Comparative Example 2

In Comparative Example 2, an Al material (material type A6061 (A6061 is a type of structural aluminum alloy materials specified in JIS Standard)) was used for a substrate.

Comparative Example 3

Comparative Example 3 shows a result of an object in which SS400 was used for a substrate and a Ni plating film was formed on the surface of the substrate by using the Ni plating solution shown in Table 1.

The film thickness of the Ni plating is 10 µm.

Comparative Example 4

In Comparative Example 4, an object was used in which SS400 was used for a substrate and a Zn plating film was formed on the surface of the substrate by using the Zn plating solution shown in Table 2. The film thickness of the Zn plating is 10 µm.

Comparative Example 5

In Comparative Example 5, an object was used in which SS400 was used for a substrate and a NiZn alloy plating film was formed on the surface of the substrate by using the NiZn alloy plating solution shown in Table 4. The NiZn alloy plating was performed under conditions in which the temperature of the plating solution was 25° C. and a current density was 3 A/dm$^2$, and for a predetermined period of time. The film thickness of the NiZn plating is 10 µm.

Comparative Example 6

In Comparative Example 6, an object was used in which: SS400 was used for a substrate and Ni was formed as the first layer by using the Ni plating solution of Table 1; then Zn was formed as the second layer by using the Zn plating solution of Table 2; and then a Ni layer was formed on the Zn layer.

Figure 10:
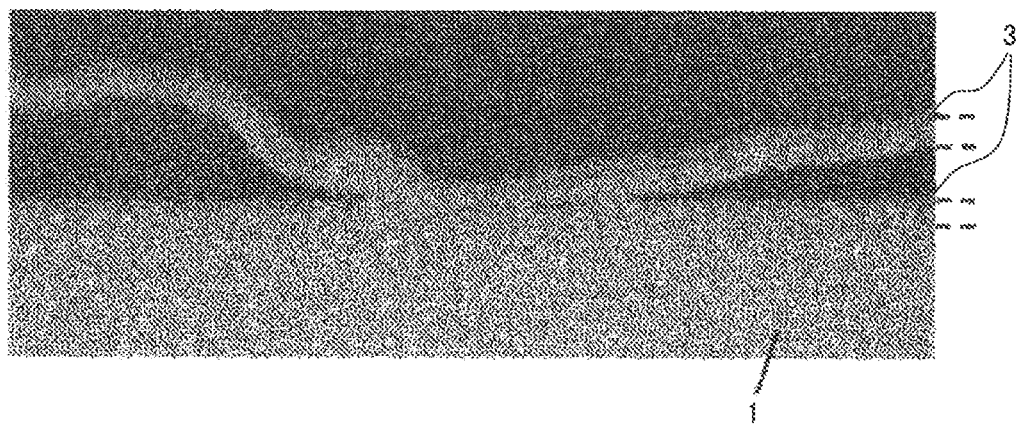
FIG. 10 is a structural observation image of the section of a coating of Comparative Example 6.

FIG. 10 illustrates an observation image of the section in Comparative Example 6. It was found that although Ni was formed on the SS 400 substrate, the next Zn layer disappeared and the Ni layer on the Zn layer was largely wavy, so that an orderly laminated structure was not formed. It is considered that: since the temperature of the Ni plating solution was relatively high and the initial set value of the current density was small, when a sample in which the Zn layer was formed was immersed in the Ni plating solution, Zn was dissolved by the reactions between the formed Zn metal and the hydrogen ions and Ni ions in the plating solution. In order to plate Ni on the surface of a metal baser than Ni in this way, it is important to suppress the reactions with the hydrogen ions and Ni ions in a plating solution as much as possible. Example 1 overcomes these problems, and specifically by lowering the temperature of a Ni plating solution and by setting the value of the initial current density of Ni plating to be high, it becomes possible for the first time to form an orderly laminated coating.

<Evaluation of Pitting Potential>

Figure 6:
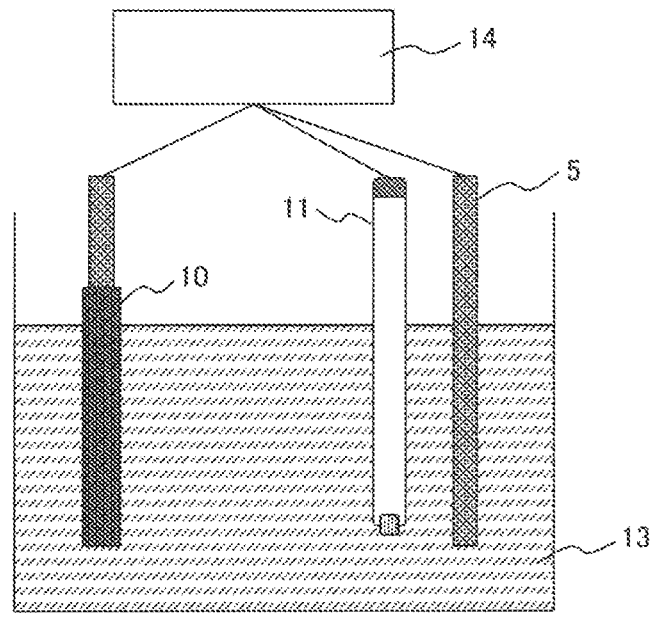
FIG. 6 is a schematic view illustrating the configuration of a corrosion resistance evaluation apparatus used in Examples and Comparative Examples.
Figure 7:
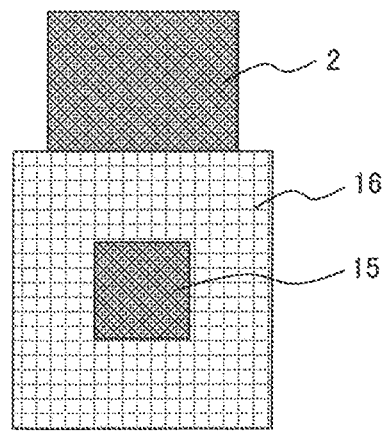
FIG. 7 is a schematic view of a working electrode for evaluating corrosion resistance used in Examples and Comparative Examples.

The corrosion resistance of Examples 1 to 6 and Comparative Examples 1 to 5 was evaluated electrochemically. FIG. 6 is a schematic view illustrating the configuration of a corrosion resistance evaluation apparatus. Electrochemical measurement was performed by: using a 5% NaCl solution saturated with air as a corrosion test solution; using a Pt line as a counter electrode 10, an Ag|AgCl electrode (saturated KCl aqueous solution) as a reference electrode 11, and a substrate on which a coating was formed on a SS400 plate as a working electrode 12; and placing each electrode in a test solution 13. The temperature of the solution was kept constant at 25° C. The working electrode had, as an evaluation region 15, a portion having an area of 1 cm$^2$ where the plating film was exposed, and the other surface was covered with a chemical resistance coating material 16, as illustrated in FIG. 7. An immersion potential was measured by using an electrochemical measuring apparatus 14 and by holding the electrodes in the solution for 10 minutes, and then dynamic potential polarization measurement was performed. A potential scanning range was set to range from −100 mV to a maximum of 1500 mV with respect to the immersion potential, and a scanning speed was set to 30 mV/min. According to JIS G0577: 2014, the corrosion resistance of a coating was evaluated by measuring a potential, at which the current density became 0.1 mA/cm$^2$ in an anode curve, as a pitting potential.

Figure 8:
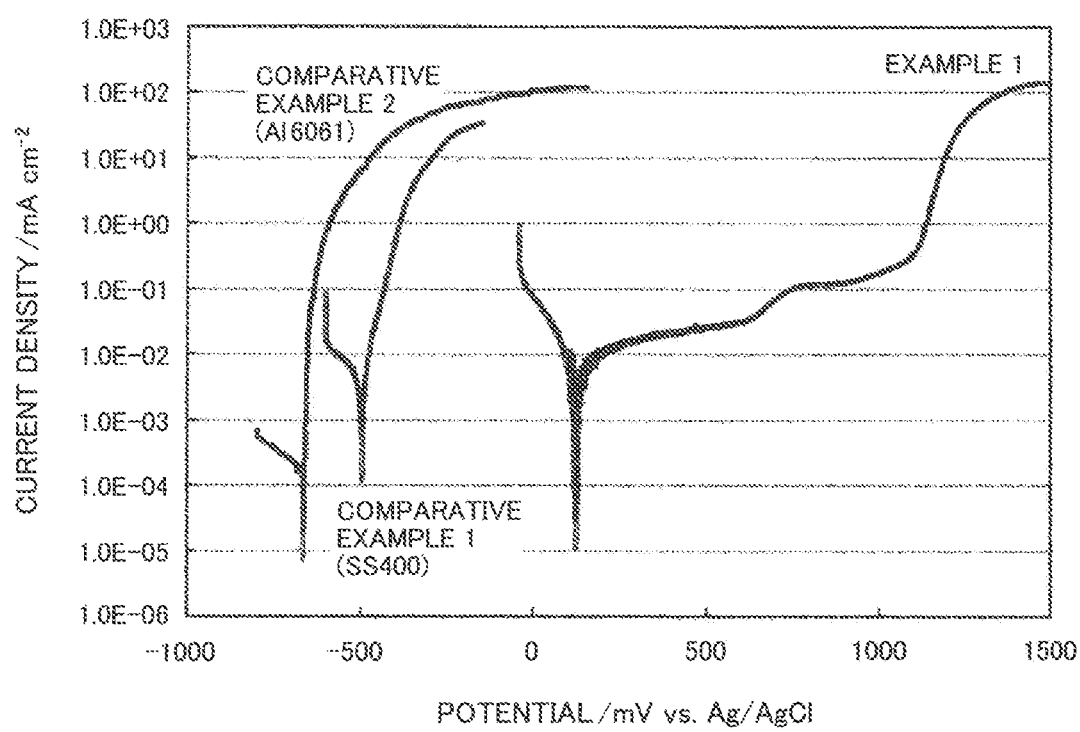
FIG. 8 illustrates one example of the results of evaluating the corrosion resistance of Example 1 and Comparative Examples 1 and 2.

The evaluation results of Example 1 and Comparative Examples 1 and 2 are illustrated in FIG. 8. It was found that: for the sample in which a coating was formed, each immersion potential was shifted to a nobler potential than the substrate, and further a rise in the anode current was suppressed in the range of 200 mV to 1000 mV; and hence the sample exhibited excellent corrosion resistance. The rise in the current when the potential was 1100 mV or more is due to oxygen generation. It was confirmed that corrosion resistance can be greatly improved by forming a coating on a substrate in this way.

Here, in order to quantitatively evaluate the corrosion resistance of each plating film, a pitting potential, at which the current density became 0.1 mA/cm$^2$, was calculated from the polarization curve obtained by using the obtained coating. The results are shown in Table 5.

<Evaluation of Abrasion Resistance>

In order to evaluate the abrasion resistance of Examples 1 to 6 and Comparative Examples 1 to 5, evaluation was performed by using a reciprocating sliding test machine. After the mating material was brought into contact under a non-lubricating condition with a predetermined load, the sample side was slid reciprocally at a predetermined speed. A weight change per unit sliding distance, that is, an abrasion rate (μg/m) was calculated from the weight of the sample after being slid by a predetermined distance and the initial weight, and its reciprocal (m/μg) was adopted as an evaluation index of abrasion resistance. Sliding conditions were set as follows: the sliding speed was 0.1 m/s, the load was 9.8 N, the sliding distance (one way) was 0.04 m, and the mating material was a special steel SUJ2 ball (spherical diameter φ 10 mm) commonly used for bearings and the like. The measurement environment temperature was set to room temperature (approximately 22° C.). Evaluation results are shown in Table 5.

TABLE 5

| | Substrate | Plating film | Pitting potential (mV vs. Ag/AgCl) | Abrasion resistance (m/μg) |
|---|---|---|---|---|
| Example 1 | SS400 | 11 layers (Ni/Zn) | 750 | 0.009 |
| Example 2 | SS400 | 19 layers (Ni/Zn) | −289 | 0.012 |
| Example 3 | SS400 | 11 layers (Ni/Al) | 236 | 0.007 |
| Example 4 | SS400 | 11 layers (Ni/NiZn) | 737 | 0.009 |
| Example 5 | SS400 | 5 layers (NiP/Zn) | 581 | 0.027 |
| Example 6 | SS400 | 5 layers (NiP/Zn, heat treatment) | 470 | 0.031 |
| Comparative example 1 | SS400 | — | −433 | 0.08 |
| Comparative example 2 | Al6061 | — | −570 | 0.006 |
| Comparative example 3 | SS400 | Electroplated Ni | 20 | 0.004 |
| Comparative example 4 | SS400 | Electroplated Zn | −1010 | 0.007 |
| Comparative example 5 | SS400 | Electroplated Ni—Zn | −846 | 0.005 |

It can be relatively evaluated by a pitting potential how resistant the surface of a material is to pitting corrosion in an environment where corrosion proceeds at a certain rate. It can be said that a material having a nobler pitting potential is more excellent in corrosion resistance.

It was found from the comparison between Comparative Example 1 and Examples 1 to 6 that corrosion resistance can be improved by forming a coating on an SS400 substrate. Further, it was found from the comparison between Examples 1 to 6 and Comparative Examples 3, 4, and 5 that the coating according to the present invention exhibits higher corrosion resistance than other plating films. For example, the pitting potential in Example 1 is approximately 730 mV nobler than the electroplated Ni plating film of Comparative Example 3. This is considered to indicate the expression of a sacrificial anticorrosion effect by Zn. It is assumed that Zn contained in the film suppressed local dissolution by dispersing corrosion progression points in the plane.

It was found from the comparison between Example 1 and Comparative Examples 1 to 5 that although inferior to an SS400 substrate, the abrasion resistance of the coating in Example 1 is improved as compared to an Al substrate, electroplated Ni, Zn, and NiZn alloy plating films. It is considered that because of an effect by multilayering, Example 1 exhibited better results as compared to the NiZn alloy of Comparative Example 5.

It was found that Example 2 is more excellent in abrasion resistance as compared to Example 1. It is considered that the crystal grain size in the plating film of each layer is restricted in the film thickness direction and accordingly becomes fine by reducing the layer thickness of the each layer in the coating, whereby the coating becomes hard. As described above, the effect of improving abrasion resistance, while maintaining corrosion resistance to some extent, was able to be obtained by reducing the layer thickness of each layer in the coating.

It was confirmed from Examples 3 and 4 that a sacrificial anticorrosion effect is also expressed when Al, or NiZn was used as the second layer. It was found from Examples 1 and 3 that abrasion resistance can be improved by using Al as the second layer. In Example 4, dissolution behaviors of the second layer, occurring when immersed in a plating solution for forming the first layer after the second layer was formed, were investigated as a preliminary study. As a result, it was found that when the second layer is made of a NiZn alloy, dissolution of the second layer can be suppressed as compared to the case where the second layer is made of Zn. When the second layer is made of an alloy such as NiZn, the dissolution of the second layer can be further suppressed, and an effect, in which process management becomes relatively easy, can be exhibited in forming a laminated structure, as described above.

It was found from Examples 1, 5, and 6 that abrasion resistance can be improved by containing P into the first layer. In the present Examples, P was selected as another component, but it is considered that the same effect can be obtained also with B, other oxides, carbides, nitrides, or the like. In Example 5, another component was contained only in the first layer, however, it can be easily considered that abrasion resistance can be improved by adding another component to the second layer or to both the first and second layers. Further, when a heat treatment is performed as in Example 6, NiP contained in the first layer of the coating and Zn contained in the second layer form an intermetallic compound at the interface between them. It is considered that as a result, the coating becomes hard and abrasion resistance is improved. The effect of improving abrasion resistance, while improving corrosion resistance, was able to be obtained by forming an intermetallic compound at the interface between the first and second layers, as described above.

According to the present invention, by forming a metal laminated film structure in which Ni excellent in corrosion resistance and a metal electrochemically baser than Ni are combined, and further by forming a coating containing a third component, a sacrificial anticorrosion effect can be exhibited; and by multilayering and hardening of the film, the corrosion resistance and abrasion resistance of a structural member or a product that is used under a severe environment can be improved, whereby maintenance work can be reduced and the life of the member or the product can be extended, as described above.

REFERENCE SIGNS LIST

1 . . . substrate,
2 . . . coating,
3 . . . first layer,
4 . . . second layer,
5 . . . unit structure,
6 . . . lower layer,
7 . . . upper layer,
8 . . . adhesion layer,
9 . . . third metal layer,
10 . . . counter electrode,
11 . . . reference electrode,
12 . . . working electrode,
13 . . . test solution,
14 . . . electrochemical measuring apparatus,
15 . . . evaluation area,
16 . . . coating material.

The invention claimed is:

1. A laminated body comprising:
a substrate, the substrate being at least one of carbon steel, stainless steel, Cu, Al, and an alloy thereof; and
a coating formed on a surface of the substrate;
wherein the coating includes repeated unit structures each composed of a first layer comprising Ni, a content ratio of Ni in the first layer is 50 wt % or more of the first layer, and a second layer comprising a metal whose electrode potential is baser than that of Ni, a content ratio of the metal in the second layer is 50 wt % or more of the second layer,
wherein the second layer is at least one of Zn, Fe, Al and alloys thereof,
wherein an outermost layer of the coating is the first layer, and
wherein the first layer is composed of a plurality of layers having different Ni content ratios.

2. The laminated body according to claim 1, wherein the first layer is composed of a plurality of layers having different Ni crystal grain sizes.

3. The laminated body according to claim 1, wherein the content ratio of Ni in the first layer is 80 wt % or more.

4. The laminated body according to claim 1, wherein the content ratio of Ni in the first layer is 80 wt % or more, and
a content ratio of Zn in the second layer is 80 wt % or more.

5. The laminated body according to claim 1, wherein a thickness of the first layer and a thickness of the second layer are 1 μm or less.

6. The laminated body according to claim 1, wherein the first layer or the second layer contains at least one of an oxide, a carbide, a nitride, and an organic polymer.

7. The laminated body according to claim 1, wherein the first layer or the second layer contains P or B as an additive.

8. The laminated body according to claim 1, wherein an alloy layer of Ni and a metal whose electrode potential is baser than that of Ni is formed between the first layer and the second layer.

* * * * *